Nov. 1, 1960
A. H. BAHNSON, JR
2,958,790
ELECTRICAL THRUST PRODUCING DEVICE
Filed May 12, 1958
3 Sheets-Sheet 1
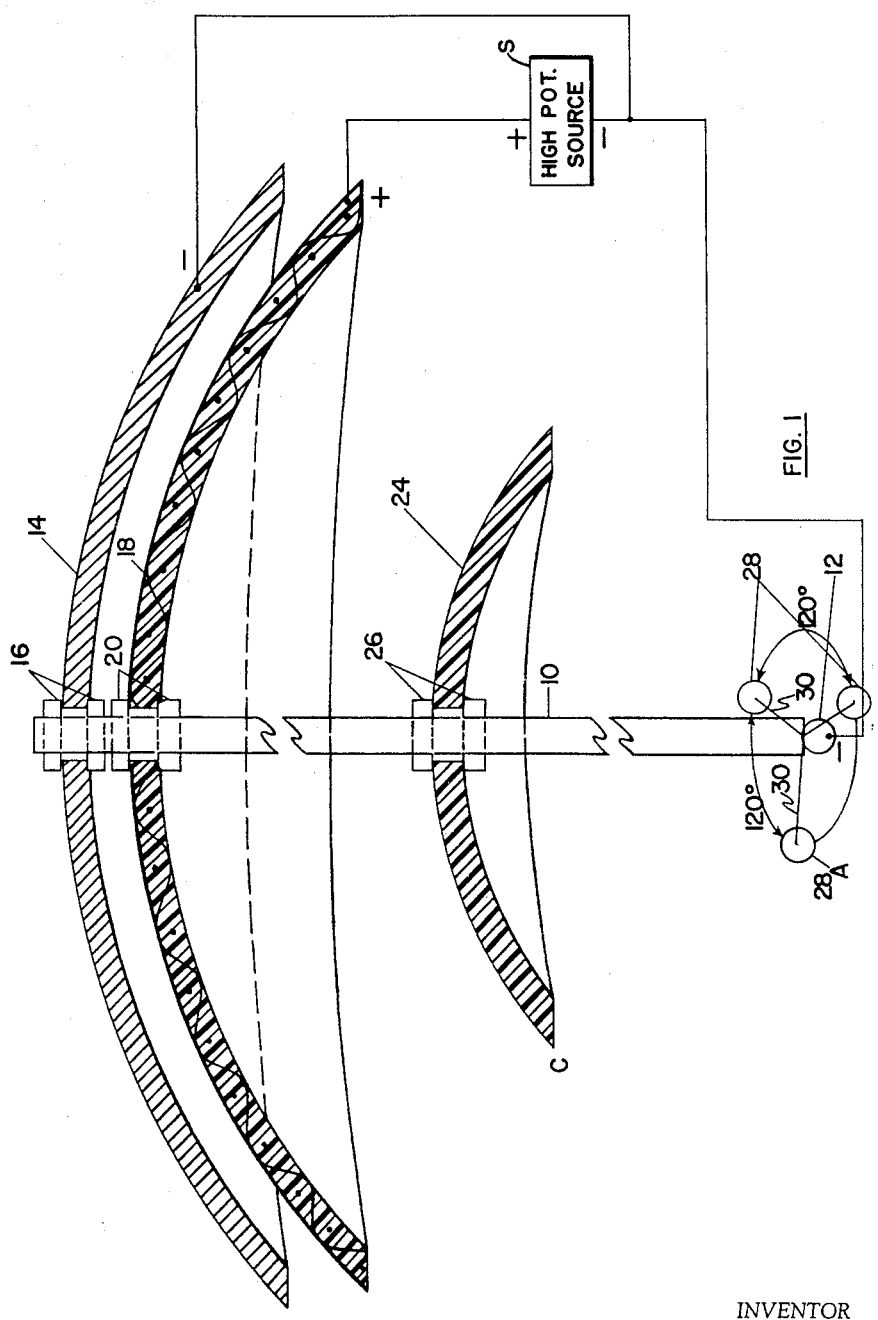
INVENTOR
Agnew H. Bahnson Jr.
BY
Watson Cole, Grindle & Watson
ATTORNEYS Nov. 1, 1960   A. H. BAHNSON, JR   2,958,790
ELECTRICAL THRUST PRODUCING DEVICE
Filed May 12, 1958   3 Sheets-Sheet 2

INVENTOR
Agnew H. Bahnson Jr.
BY
Watson, Cole, Grindle & Watson
ATTORNEYS

Nov. 1, 1960     A. H. BAHNSON, JR     2,958,790
ELECTRICAL THRUST PRODUCING DEVICE

Filed May 12, 1958     3 Sheets-Sheet 3

INVENTOR.
Agnew H. Bahnson Jr.
BY
Watson, Cole, Grindle & Watson
Attorneys

United States Patent Office 2,958,790
Patented Nov. 1, 1960

2,958,790

ELECTRICAL THRUST PRODUCING DEVICE

Agnew H. Bahnson, Jr., Box 367, Salem Station, Winston-Salem, N.C.

Filed May 12, 1958, Ser. No. 734,494

14 Claims. (Cl. 310—5)

This invention relates to electrical apparatus and more particularly to an apparatus for utilizing electrical current and voltages for the production of forces for causing motion of the apparatus.

I have discovered certain new and improved apparatus for producing thrust in response to the direct application of electrical potentials and currents.

It is an object of this invention to provide an improved apparatus for producing thrust by means of applied electrical potentials.

It is a further object of this invention to provide an improved apparatus for producing thrust in response to the application of electrical potentials and electrical currents.

Briefly in accordance with aspects of this invention, one electrode is mounted on or near the end of a supporting member; another electrode, which is larger in area, is mounted on the supporting member in spaced relationship from the first electrode and a field shaping member is located intermediate the two elecrodes. Advantageously, the field shaping member has a surface which interacts with the electrostatic field created between the first electrode and the second electrode mounted in spaced relationship from it on the supporting member. These field shaping members may be arcuate or flat surfaces or may be annular surfaces. This interaction of the electric field with the intermediate surface increases the thrust produced by the device. In one specific illustrative embodiment of this invention, the field shaping member is connected to a source of potential to supplement the thrust produced by the expanded electrode. In another embodiment, the field shaping member is not directly connected to a source of potential but assumes a charge of the first electrode since it is mounted in closer proximity to that electrode than to the expanded electrode.

In accordance with other aspects of this invention, the expanded field shaping electrode is mounted in spaced relationship on the supporting member from the first electrode and a field shaping member is mounted on the supporting member intermediate the two electrodes. The intermediate member introduces a non-linearity in the field gradient between the two electrodes and thus causes an additional thrust to be developed by the device.

It is still another feature of this invention to mount an electrode on one end of the supporting member, to rotatably mount an arcuate electrode intermediate the supporting member and to rotatably mount a field shaping member in spaced relationship from the first electrode on the supporting member.

It is another feature of this invention to mount an electrode adjacent one end of the supporting member, to rotatably mount an electrical force field producing electrode intermediate the ends of the supporting member and to rotatably mount an interacting member on the supporting member intermediate the two electrodes.

It is still another feature of this invention to mount an elecrode on a supporting member, to mount a force field producing electrode on the supporting member spaced from the first electrode, and to mount a plurality of curved electrodes on the supporting member adjacent the first electrode and spaced from the supporting member and from each other and selectively to apply potentials between the force field producing electrode and one or more of the curved electrodes.

It is still a further feature of this invention to mount an electrode on a supporting member, to mount a plurality of electrodes on the supporting member spaced from the first electrode and from each other, to mount an electrical force field producing surface on the supporting member remote from the electrodes, to mount a field shaping member intermediate the ends of said supporting member and selectively to apply potentials to the electrical force field producing surface and the electrodes.

It is still a further feature of this invention to rotatably mount a plurality of surface members on a supporting member and to apply potentials to certain of these surface members and to employ certain others of the members to control the field of the charged member.

It is a further feature of this invention to mount a field shaping member between two electrodes and to vary the field between the electrodes by moving the field shaping member relative to the electrodes.

It is still a further feature of this invention to mount an electrode adjacent one end of the supporting member, an arcuate field shaping member in spaced relationship from the first electrode and to rotatably mount a pair of arcuate members intermediate the first electrode and the arcuate field shaping member.

These and various other objects and features of the invention will be understood more fully from the following detailed description when read with the accompanying drawing in which:

Figure 1 is a view in elevation, partly in section, of one illustrative embodiment of this invention;

Figure 4:
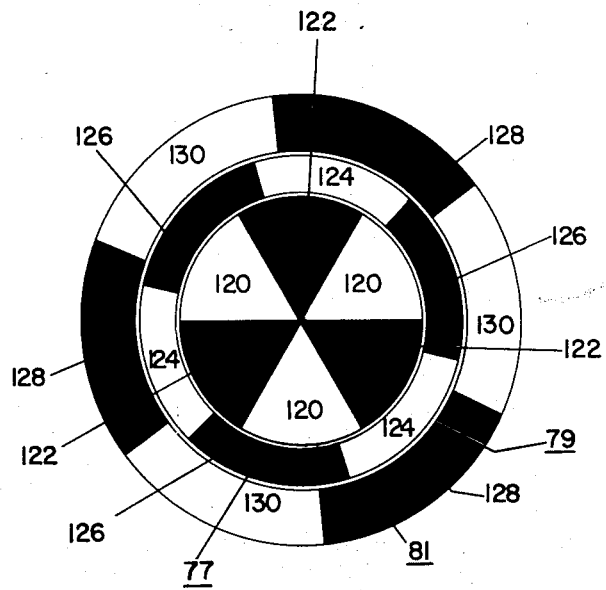
Figure 4 is a sectional view taken along the line 4—4 of Figure 3.

Referring now to Figure 1 there is depicted a thrust producing device comprising a rod-like supporting member 10, a point electrode 12 mounted on one end of the rod 10 and a conducting arcuate member 14 for shaping an electrical force field mounted in spaced relationship with respect to point electrode 12. An arcuate electrode 18 is rotatably mounted on rod 10 by means of suitable bearings 20 and positioned in the region of canopy or arcuate member 14. Electrode 18 is preferably construced of a non-conducting material, such as fiberglass and resin, and has conducting material, such as wires spaced from each other and embedded in the non-conducting material to extend virtually over the entire surface. An arcuate interacting member 24 is rotatably mounted on rod 10 by means of suitable bearings 26. Arcuate member 24 is mounted intermediate the point electrode 12 and arcuate electrode 18. Electrodes 12 and 18 are connected to terminals of a source S of high potential by suitable conductors. Three curved surfaces 28 are mounted adjacent the end of rod 10 by means of suitable insulating supporting rods 30 in equally spaced relationship with respect to each other. Within each of these curved surfaces 28 a rotatable condenser is mounted, having electrode of larger and smaller surfaces secured to a member which is rotatably mounted about a point at the center of the sphere. The construction of the condensers within the spherical surfaces 28 is described and shown in more detail in the embodiment according to Fig. 3 which will be subsequently described. These condensers may be employed to produce thrust in any predetermined direction when a potential is applied to their electrodes. These potentials may be applied to only one of the condenser such that an unbalanced force is produced on the entire assembly.

While the supporting member 10 is herein described as being a rod, it is to be understood that any suitable configuration of dielectric support may be employed. For example, a support may be in the form of a hollow cylinder in which the active members are supported on the inner periphery of the cylinder. Numerous other shapes and curvatures of the members may be employed to shape the field emanating from the electrodes. For example, member 24 may be in the form of an annular ring supported from the dielectric member to create an irregularity in the field gradient between the electrodes.

When one terminal of the source of potential (preferably positive) is connected to arcuate electrode 18 and the other terminal of the source of potential (preferably negative) is connected to electrode 12, the thrust producing device tends to move in an upwardly direction with respect to rod 10 as viewed in Figure 1.

I have discovered that if a conducting canopy in the form of arcuate electrode 14 is placed on the opposite side of electrode 18, the resulting device produces an increased thrust at lower voltages with higher currents when a potential of the same polarity as that applied to point electrode 12 is applied to conducting canopy electrode 14. By putting a variable resistor or series of resistors between conducting canopy electrode 14 and the source of potential (normally negative) applied to electrode 12, it is possible to alter the relationship of voltage and current for the lift produced which in effect is similar to shifting gears. Apparently, this change in results is due to the reflection or confinement of the electrostatic field produced by the convex surface of arcuate electrode 18 and point electrode 12 which extends above 18 in the direction of canopy 14. The spacing between electrode 18 and electrode 14 must be sufficient to prevent arcing over of the high voltage potential applied to electrode 18 as electrode 14 is progressively charged to an opposite potential. Arcuate member 24, which is normally but not necessarily of dielectric material, causes non-linearity in the field gradient between electrodes 12 and 18 and thus causes the thrust developed by the device to be still further increased in proportion to the increased surface of element 24 relative to that of point electrode 12. The amount of thrust developed can be varied by movement of member 24 relative to electrodes 18 and 12.

The application of potentials to electrodes 12 and 18 induces a charge on the surfaces of canopy 24 which causes canopy 24 to tend to rotate in one direction and the reaction of these forces is a torque applied to electrode 18, causing electrode 18 to rotate in a direction opposite to that of canopy 24. The counter rotation of these arcuate members tends to stabilize the device and also to cause a greater thrust to be developed.

The direction of thrust may be varied slightly by the orientation of the movable condenser in one or more of members 28. For example, if in addition to applying negative potentials to electrode 12, the condenser is oriented with the layer surface down in member 28A, then the direction of thrust will not be coaxial with the axis of rod 10, but will in fact be in a direction passing through the center of a point between electrode 12 and spherical member 28A and the apex of electrode 18. Thus, the selective orientation of the condensers in members 28 or the selective application of potentials to members 28 if they be used as conducting electrodes may be utilized as steering or canting means for the thrust producing device. This steering or canting feature constitutes the subject matter of a co-pending divisional application Serial No. 34,672, filed June 8, 1960. Spherical or curved electrodes end members 28 may also be employed to augment the thrust produced by the device if all the electrodes end members 28 are energized to the same potential as electrode 12, or if all the condensers in members 28 are oriented with the large surfaces pointing toward electrode 18.

Figure 2:
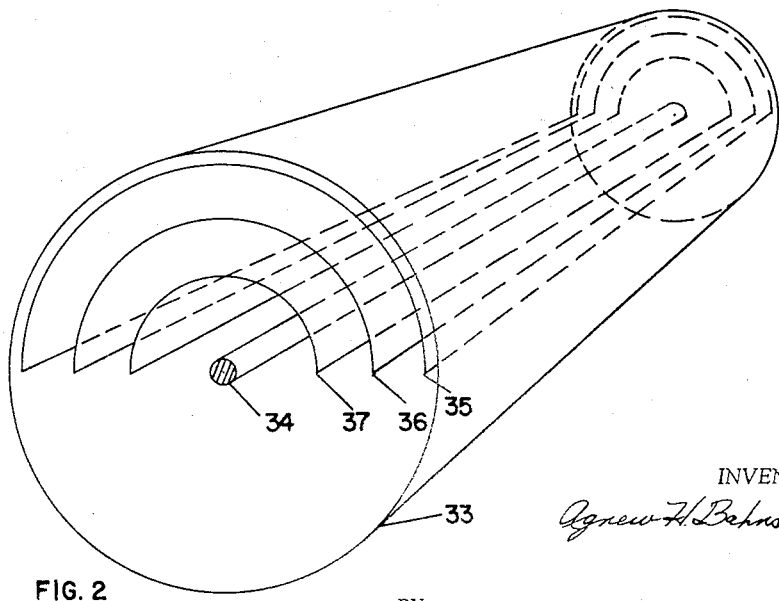
Figure 2 is a view in elevation, partly in section, of another illustrative embodiment of this invention.

Referring now to Figure 2, there is depicted another illustrative embodiment of this invention. Figure 2 is an end view of a cylindrical dielectric member 32 in which an electrode 34 is mounted on the end walls of member 32 in the region of the axis of the cylindrical member 32. Advantageously, electrode 34 may be an elongated rod extending along the axis of cylindrical member 32. Also secured to the end walls of cylindrical member 32 are a plurality of curved surfaces 35, 36 and 37. Members 35, 36 and 37 extend longitudinally of the cylindrical dielectric member 32. Member 35 has a conducting inner surface and its operation corresponds to that of member 14 in Figure 1. Member 36 is a surface containing conducting elements such as wires embodied in a suitable dielectric surface or member 36 may merely be a conducting surface and its function corresponds to that of member 18 in Figure 1. Member 37 is a dielectric member and its operation corresponds to that of member 24 in Figure 1. Each of the electrodes is connected to a suitable source of potential (not shown). Electrode 34 and 35 may have applied thereto the same potential while electrode 36 will have applied thereto the opposite potential. Alternating current potentials may be superimposed on these direct current potentials or they may be applied in place of the direct current potentials.

Figure 3:
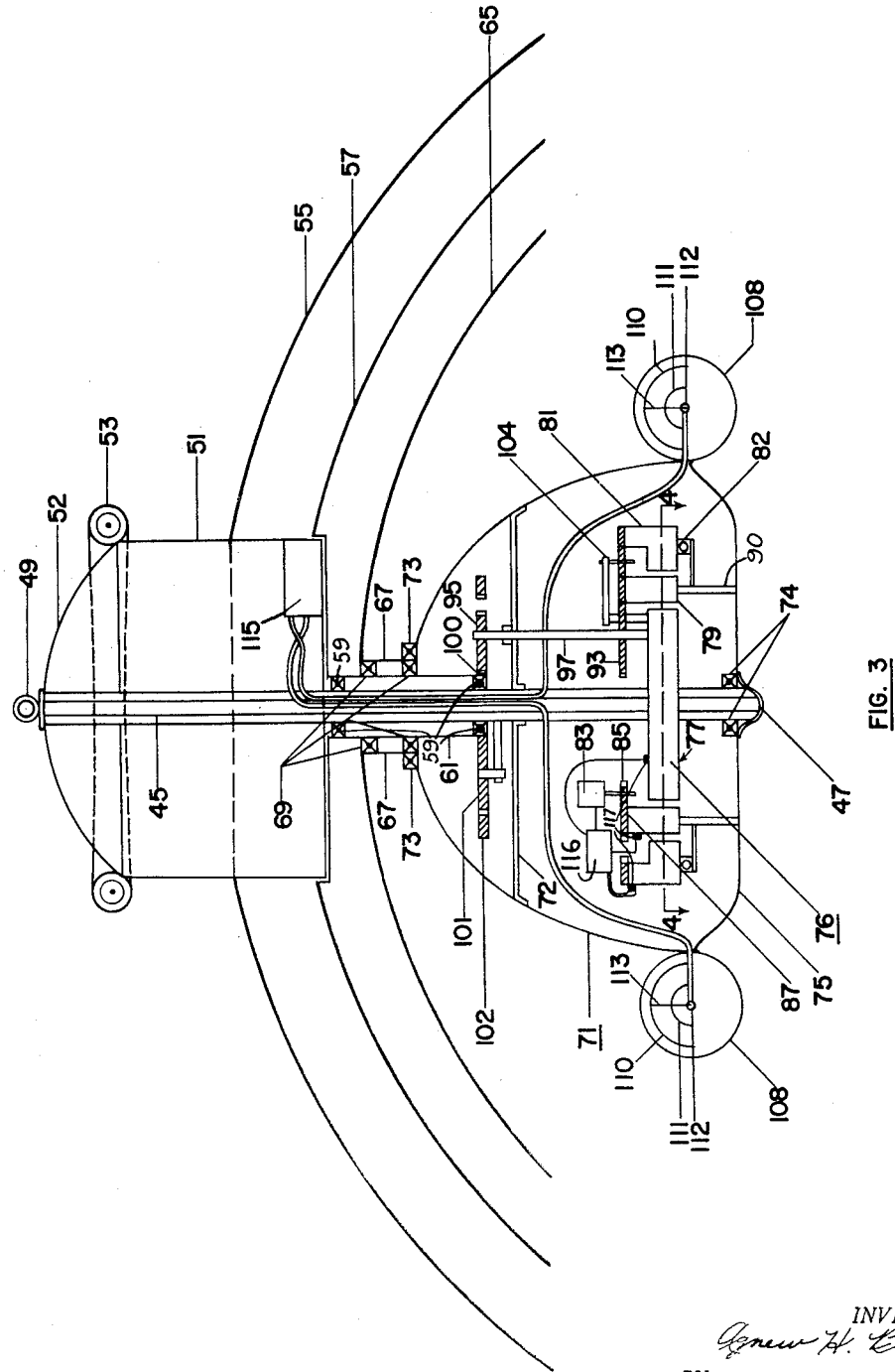
Figure 3 is a view in elevation, partly in section, of still another illustrative embodiment of this invention.

Referring now to Figure 3, there is depicted still another illustrative embodiment of this invention. As therein depicted, the thrust producing device is assembled around a central supporting rod or pylon 45. On one end of pylon 45 is mounted an electrode 47, while on the other end of pylon 45 a conducting member 49 is mounted. An enclosed dielectric chamber or load carrying container 51 is secured in the region of one end of rod 45. This compartment or cabin has a domed top 52 constructed of insulating material in a manner similar to member 24 in Figure 1. Toroidal coil 53 is located at the junction of the domed top and the top of the cabin for the purpose of shaping the field of the electrodes. When conducting member 49, which may be a coil, as shown, and coil 53 are charged to the potential of curved member 57, the resulting field aids the field radiating from the electrodes by acting as field shaping devices. By charging elements 49 and 53, the lift or thrust developed by the device is increased in the order of 20% to 30%. A first arcuate member 55 is secured to chamber 51 and comprises conducting or semi-conducting material. A second arcuate member 57 is rotatably mounted on rod 45 by means of suitable bearings 59. Arcuate member 57 defines an electrical force field producing electrode which may be of individual wires embedded in a dielectric material either running radially from the center of the electrode toward the edges or circularly in a spiral around the surface of the electrode. Electrode 57 is connected to a cylindrical member 61 which is preferably of dielectric material and is spaced from rod 45 by means of the previously mentioned bearings 59. A third arcuate member 65 is secured to a cylindrical portion 67 which is rotatably mounted around the outer periphery of cylindrical member 61 by means of suitable bearings 69.

A housing member 71 is supported on one end of the central pylon 45 by annular plate 72. Bearings 73 are positioned between the upper edge of housing 71 and cylindrical member 67. The bottom 75 of housing 71 is free to rotate on bearings 74 since it does not come in contact with housing 71.

Electric motor 76 is mounted within housing 71 and includes a stator member 77 secured to rod 45 by suitable means (not shown) and a first rotor 79 rotatably mounted concentric with the stator 79. This rotor 79 is attached to and rotates with the bottom housing 71 by means of supports 90. A second rotor member 81 is rotatably mounted around the outer periphery of rotor 79 and is supported on bearings 82. The rotation of the rotor 79 and rotor 81 is started by starter 83 which may be of any convenient type, such as an electrical motor. Starter 83 is connected to rotor 79 by means of a suitable gear 85 which engages a rack 87 on the inner periphery of rotor 79. Rotor 79 is also coupled to cylindrical member 61 by means of suitable gears 93 and 95 mounted on shaft 97. Shaft 97 is rotatably mounted in stator 77 and annular plate 72 by means of suitable bearings (not shown). Gear 93 engages rack 87 while gear 95 engages an annular gear 100 attached to the outer periphery of cylindrical member 61. A stationary gear 101 transmits power from gear 100 to gear 102 which is connected to an extension of cylindrical member 87 and this gearing arrangement causes the counter rotation of cylindrical members 61 and 67 and thereby arcuate members 57 and 65. An idler gear 104 is positioned between rotors 79 and 81 and engages a rack on the outer periphery of rotor 79 and another rack on the inner periphery of rotor 81 causing these two members to counter rotate.

A plurality of spheres (or curvaceous surfaces) 108, for example three, are mounted at equally spaced distancesa round the outer periphery of housing 71 and each encloses a pair of arcuate electrode surfaces 110 and 111 rotatably mounted about a pivot point or point electrode 112 by means of a rod 113. These electrodes 110 and 112 produce thrust in a manner similar to electrodes 18 and 12 in Figure 1. The direction in which this thrust is produced is from point electrode 112 along the axis of electrode 110. It will therefore be apparent that the direction of thrust produced by these rotatable condensers on the pylon 45 can be controlled by controlling the direction of orientation of rod 113. The orientation of rod 113 can be controlled by any convenient means, such as by suitable motors and gears (not shown) or their orientation may be controlled manually.

Arcuate member 55 performs the same function of reflecting or confining the field emanating from electrode 57, as was performed by conducting member 14 with respect to electrode 18. The elements contributing to increased thrust over that produced by the element 57, which is normally positively charged, and point electrode 47, which is normally negatively charged, are the following: The intermediate member 65 which interacts in the field established between electrodes 47 and 57, the introduction of the reflection or confining canopy 55, the counter rotation of charged surfaces 65 and 57, the three rotatable condensers, the toroidal coil 53, circular member 49 on top of the pylon, and dielectric dome 52 which is a field shaping component between coil electrode 49 and coil 53 when both of them are charged positively or the same charge as element 57.

Referring now to Figure 4 there is depicted a sectional view of electrostatic motor 76 taken along the line 4—4 of Figure 3. As shown therein, stator 77 and rotors 79 and 81 each comprises alternate conducting segments 120, 124 and 130 and insulating segments 122, 126 and 128. The conducting segments 120 of stator 77 and the conducting segments 130 are charged to the same potential by source 116, shown in Figure 3, while the conducting elements 124 of rotor 79 are charged to a different potential by source 116. The connections between source 116, rotors 79 and 81 and stator 77, are made by suitable brushes 117, as seen in Figure 3. These brushes are positioned to engage and disengage the conducting segments at the proper time during their rotation such that they are energized to induce rotation relative to stator 77.

Starter motor 83 is provided to initiate rotation of rotors 79 and 81 through a system of gears 85, 87 and 104, as mentioned above. After the rotation is initiated, starter motor 83 may be disconnected through a suitable switch or ratchet mechanism (not shown).

Generator 115 is connected through suitable conductors (not shown) to each of the electrodes to be energized, including coil electrodes 49 and 53. Although numerous combinations of potentials may be applied to the electrodes, best results are achieved by applying the same potentials to electrodes 49, 53 and 57 and opposite potentials to electrode 47. These potentials may all be supplied from generator 115 through suitable cables and brushes in the case of the rotating electrodes.

The electrodes of each of the above-mentioned devices are energized by suitable sources of electrical potential from generator 115. Direct current potentials may be employed or, alternatively, alternating current potentials may be employed.

While I have shown and described various embodiments of my invention, it is understood that the principles thereof may be extended to many and varied types of machines and apparatus. The invention therefore is not to be limited to the details illustrated and described herein.

I claim:

1. A device for producing thrust in response to the application of electrical potentials to the electrodes thereof comprising a first electrode, a second electrode having an expanded surface with respect to said first electrode, a supporting member connecting said electrodes, and means mounted on said supporting member in spaced relationship with respect to said electrodes for shaping the field gradient of said electrodes.

2. A device in accordance with claim 1 wherein a field gradient shaping means is mounted adjacent said second electrode and remote from said first electrode.

3. A device in accordance with claim 1 wherein said second electrode is mounted intermediate said field gradient shaping means and said first electrode.

4. A device in accordance with claim 1 wherein said field gradient shaping means is mounted on said supporting member intermediate said first and second electrodes.

5. A device in accordance with claim 1 wherein said second electrode and said field gradient shaping means are rotatably mounted on said supporting member and which further includes means for rotating said second electrode and said field shaping means in opposite directions for stabilizing said device in the direction of the produced thrust.

6. A device in accordance with claim 4 wherein said field gradient shaping means and said second electrode are rotatably mounted on said supporting member and which further includes means for rotating said second electrode and said field shaping means in opposite directions for stabilizing said device in the direction of the produced thrust.

7. An electrical device for producing thrust comprising a supporting member having a first electrode mounted on one end thereof, a second electrode having an arcuate shape and mounted on said supporting member remote from said first electrode, an arcuate member mounted on said supporting member intermediate the two electrodes, a source of high potential having positive and negative terminals, circuit means connecting the negative terminal of said potential source to one of said electrodes and circuit means connecting the positive terminal of said potential source to the other of said electrodes.

8. A device for producing thrust in response to the application of electrical voltage comprising a supporting member, a first electrode mounted on said member, a pair of arcuate electrodes mounted on said member in spaced relationship with respect to each other and with respect to said first electrode, a source of high potential having positive and negative terminals, circuit means connecting one terminal of said high potential source to said first electrode and to one of said arcuate electrodes, and circuit means connecting the other terminal of said high potential source to the other of said arcuate electrodes.

9. A device for producing thrust in response to the application of electrical voltages comprising a non-conductive supporting member, a first electrode mounted on said supporting member, a second electrode having an extensive surface area and mounted on said supporting member in spaced relationship with said first electrode, an intermediate field shaping surface mounted on said supporting member between said electrodes, a field shaping member mounted on said supporting member adjacent said second electrode and on the side thereof remote from said first electrode, a source of high potential having positive and negative terminals, circuit means connecting one terminal of said high potential source to said first electrode and to said field shaping member, and circuit means connecting the other terminal of said high potential source to said second electrode.

10. A device in accordance with claim 9 wherein said second electrode and said intermediate field shaping surface are rotatably mounted on said supporting member, and which further includes means for rotating said second electrode and said intermediate field shaping surface in opposite directions for stabilizing said device in the direction of the produced thrust.

11. A device for producing thrust in response to the application of electrical voltages comprising a supporting member, a first and a second electrode mounted on opposite ends of said supporting member, a pair of arcuate electrodes mounted on said supporting member intermediate said first and said second electrodes and in spaced relationship with respect to each other, a source of high potential having positive and negative terminals, circuit means connecting one terminal of said high potential source to said first electrode and to one of said arcuate electrodes, and circuit means connecting the other terminal of said high potential source to said second electrode and to the other of said arcuate electrodes.

12. A device in accordance with claim 11 further comprising an arcuate surface mounted on said supporting member intermediate said arcuate electrode and said first electrode.

13. A device in accordance with claim 12 wherein said arcuate surface and one of said arcuate electrodes are rotatably mounted on said supporting member, and which further includes means for rotating said arcuate surface and one of said arcuate electrodes in opposite directions for stabilizing said device in the direction of the produced thrust.

14. A device in accordance with claim 11 and further comprising a toroidal coil mounted on said supporting member adjacent said second electrode and circuit means connecting said coil to said other terminal of said high potential source.

No references cited.